United States Patent

[11] 3,555,304

| [72] | Inventor | Brian Joseph Magee<br>18 St. Clements Road, Queensland,<br>Australia |
|---|---|---|
| [21] | Appl. No. | 702,056 |
| [22] | Filed | Jan. 31, 1968 |
| [45] | Patented | Jan. 12, 1971 |
| [32] | Priority | Jan. 31, 1967 |
| [33] | | Australia |
| [31] | | No. 17066/67 |

[54] FIRING UNIT FOR CONTROLLED RECITIFIERS
4 Claims, 3 Drawing Figs.

[52] U.S. Cl. .................................................. 307/262,
307/252, 307/269, 318/341, 318/345
[51] Int. Cl. ...................................................... H03k 1/12,
H03k 17/00
[50] Field of Search .......................................... 307/252,
305, 284, 262, 269; 318/341, 345

[56] References Cited
UNITED STATES PATENTS

| 3,359,484 | 12/1967 | Johnson ..................... | 307/252 |
| 3,412,314 | 11/1968 | Crane.......................... | 307/252 |
| 3,413,534 | 11/1968 | Stringer...................... | 318/345 |
| 3,443,188 | 5/1967 | Mortimer..................... | 307/252 |

*Primary Examiner*—Donald D. Forrer
*Assistant Examiner*—John Zazworsky
*Attorney*—Oberlin, Maky, Donnelly & Renner

ABSTRACT: A firing unit for a controlled rectifier produces a firing pulse in response to equality of a DC error voltage and a voltage which is the integral of the rectifier input waveform; the integrated voltage is reset each cycle and its preset value clamped at a constant level. Means for producing the error voltage may also use integration of the output current in the rectifier load.

Fig. 2.

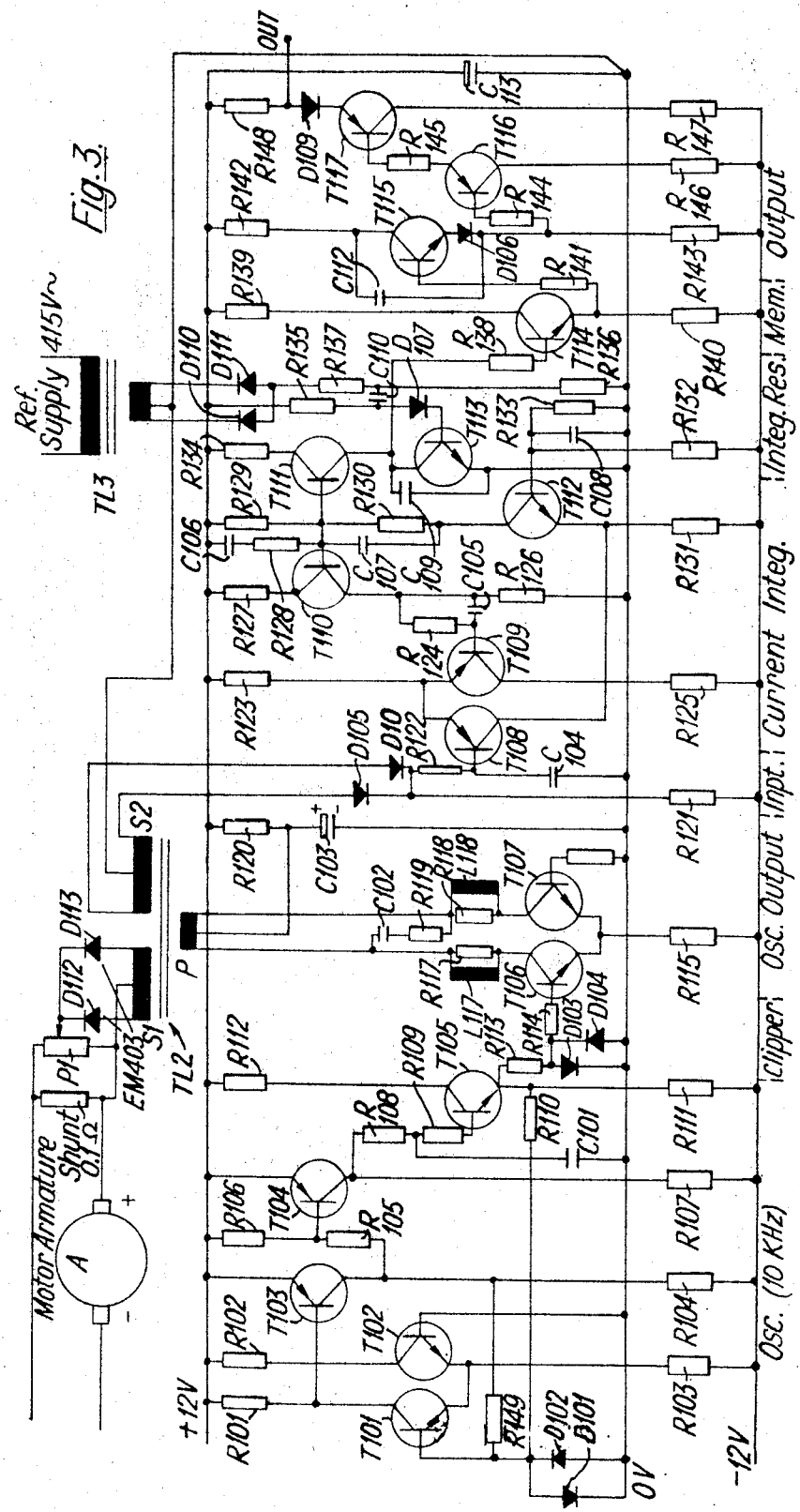

FIRING UNIT FOR CONTROLLED RECTIFIERS

This invention relates to a firing unit for controlled rectifiers such as silicon-controlled-rectifiers (SCR's), thyratrons and any other controlled rectifier having a timed on-off characteristic, and including bipolar devices of this general type.

Existing control or firing units for these devices are subject to various disadvantages, notably the following:
 a. Random firing due to mains voltage transients,
 b. A transfer characteristic (i.e. the ratio between DC rectifier output and firing unit error input) which is nonlinear
 c. Dependence of rectifier DC output on mains voltage fluctuations.

Discussion of these Disadvantages

*a.* It has been proposed to remove mains transients in the firing unit reference supply by RC filters operating at mains voltage, but these are only partly effective. They produce a phase change in the reference supply and are expensive. The present unit, as will be described below, dispenses with these filters and uses integration with an automatic reset on each cycle. The automatic reset automatically removes all "memory" of the previous cycles. This nonlinear return together with the integration gives an extra degree of freedom to the design and a very high immunity to noise.

*b.* In any feedback system, it is highly desirable that the transfer characteristic within the loop be linear. This ensures the same gain is available over the full working range so that servoperformance can be optimized. If the rectifier-output versus incremental gain curve is nonlinear the maximum feedback with a given transient response is limited by the highest point on the curve, while lower points have inferior incremental gain. This may result for example in high mechanical output impedance and poor unloaded speed stability. In the present invention a linear transfer characteristic is achieved, as will be described below.

*c.* The firing unit circuitry in the present unit is such that the DC rectifier output is inherently independent of the AC energizing (mains) voltage. This result is achieved without the use of feedback so that the servosystem is effectively decoupled from mains variations before any feedback is applied either in an internal or overall loop.

The principle of the present invention is generally applicable to single phase or multiphase systems, but for simplicity it will be described in relation to a single phase system using SCR's, which will be described in relation to the accompanying drawings, in which:

FIG. 3 shows the circuit of a unit producing error voltages to be applied to the circuit of FIG. 2.

Figure 1:
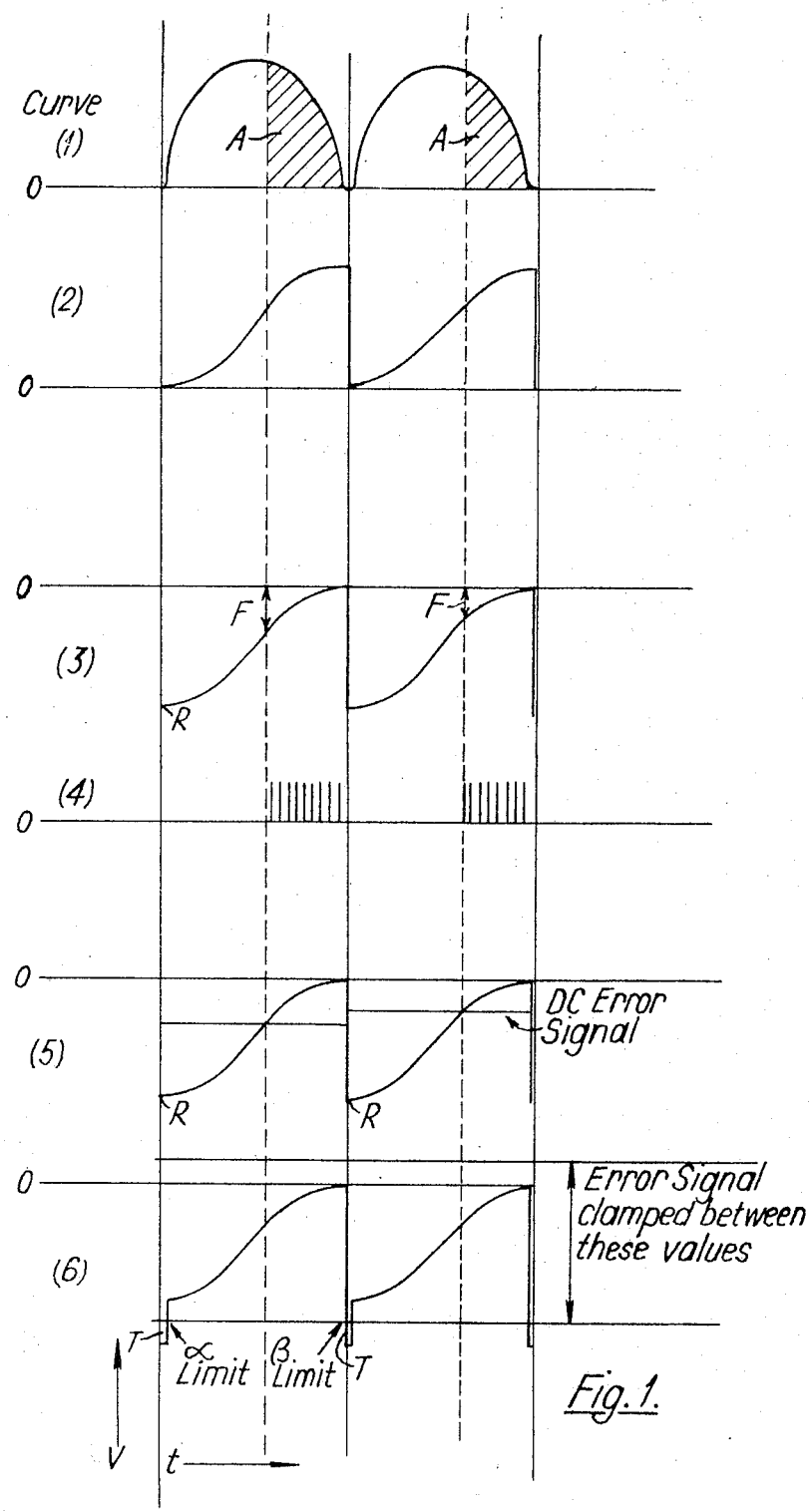
FIG. 1 shows curves explanatory of the operation of the device.

The general principles of the invention will first be described with reference to FIG. 1.

The anode voltage of the SCR's is gated on at a selected time between two extreme limits between which it is intended to fire the SCR's. In a single-phase system, the firing angle is 180°, and the effective voltage on a full-wave SCR rectifier is a full-wave rectified voltage (curve 1).

This gated voltage is integrated (curve 2) and reset to zero at the end of each gating period. The peaks of the integrated waveform rise linearly with mains voltage.

The peaks of the integrated waveform are then clamped at a fixed level, say zero volts (curve 3). Under these conditions, the start voltage R of the integrated waveform will change linearly with a variation of mains potential.

The output of the SCR's is proportional to the shaded area A in curve 1, between the trigger pulse (curve 4) and the end of the integration or clamp period. Area A is clearly proportional to distance F in curve 3.

Therefore, if the waveform of curve 3 is compared to the error signal input and a trigger pulse produced when their voltages correspond, the DC output of the SCR's is a unique and linear function of the error input. A variation in mains voltage or wave-shape will automatically produce a change in firing angle to produce a given SCR DC output for a given error signal input. This is illustrated in curve 5.

It will be noted that this result has been produced without the aid of feedback and that the correction is one cycle delayed. This is negligible for any ordinary rate of variation of mains voltage.

The clamping process may be treated mathematically as a "memory" of that constant of integration from the previous cycle (or half-cycle), represented by the position of point R in curve 3, which, when added to the indefinite integral, will always give a fixed result for the final value of the integration process.

In practice a time-guard waveform T is added to the integrated waveform as shown in curve 6, and error signals are clamped between the levels shown.

For large negative error inputs tending to produce the maximum DC output from the SCR's the firing pulse does not disappear and will not advance beyond a fixed point in the cycle (the $\alpha$ limit). On the other hand, for large positive error inputs tending to give zero SCR DC output the trigger pulse cannot pass beyond a certain limit of retardation (the $\beta$ limit), before it disappears, so ensuring that the SCR's are fully cut off.

Figure 2:
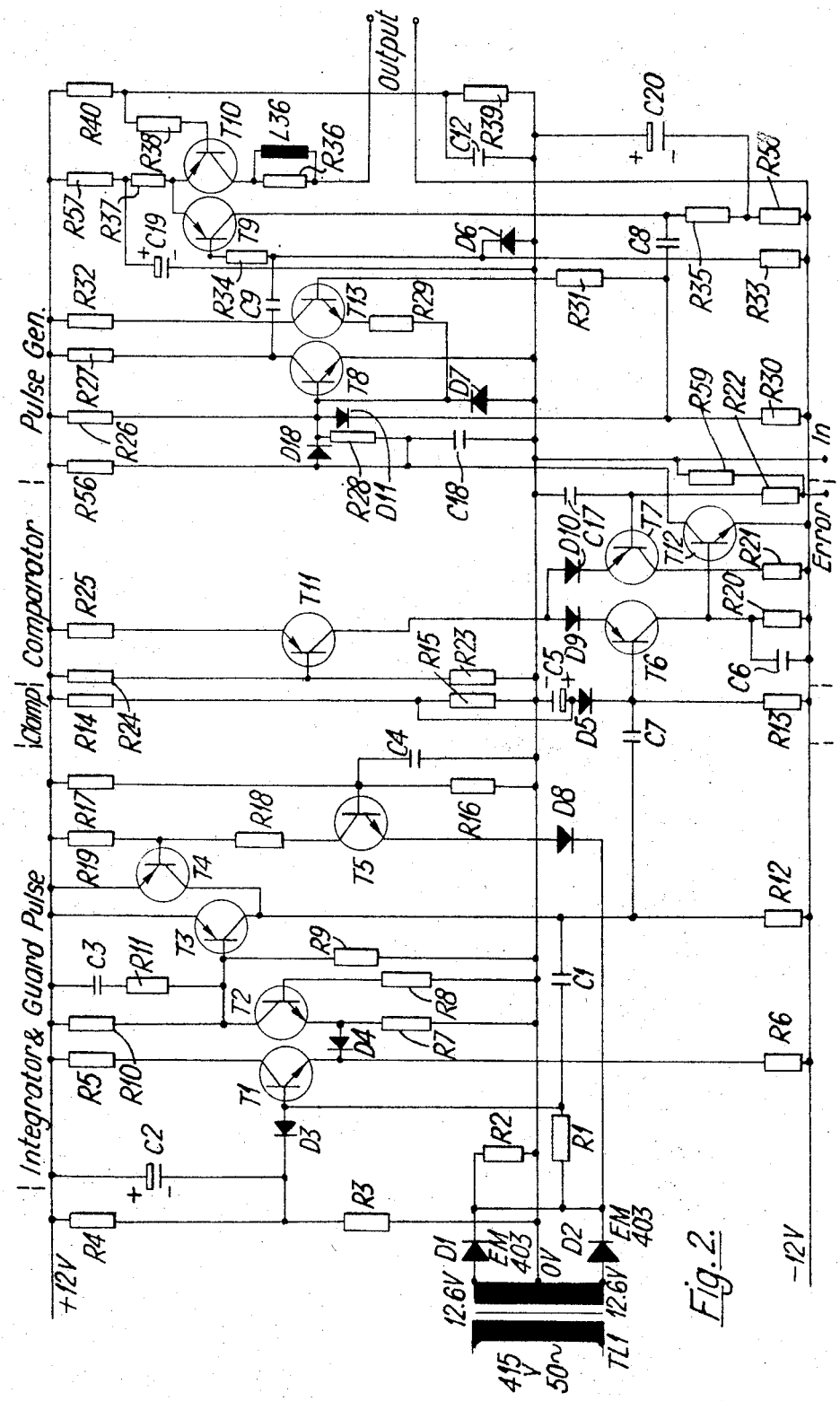
FIG. 2 shows the circuit of a firing unit.

FIG. 2 shows a circuit using the above principles. In this circuit, for practical reasons, the voltages shown in curves 2 to 6, are inverted, but, as will be understood, the same considerations apply.

The SCR anode voltage waveform is applied to the full wave rectifier $D_1$, $D_2$, $R_2$ via the voltage transformer $TL_1$, producing the full wave rectified voltage of curve 1.

The voltage about the zero crossing point is clipped by $T_5 D_8$ and a negative-going pulse occupying the reset period is applied to the base of the reset transistor $T_4$. This is heavily bottomed and paralyzes the Miller integrator $T_1 D_4 T_2 T_3 R_1 C_1$, so that the output of the Miller integrator must reside at nearly the rail potential during the reset pulse. This, together with the action of $R_4 R_3 D_3 C_2$, produces guard pulse T of curve 6.

The heavy reset current flows around the loop $C_2 4C_1 D_3$.

The SCR anode voltage waveform is applied to the Miller integrator via $R_1$ and is integrated between clamping periods giving the integration in curve 2.

The clamp C7 D5 clamps the negative-going peaks of the composite waveform to a definite potential set by the positive regulated rail and $R_1 R_{15}$ as in curve 3.

A comparator circuit $T_6 T_7 T_{11}$ is fed with the integrated waveform via capacitor C7 and with error voltage from a current integrator (to be later described) at the "error in" terminals, and, on equality of these inputs, initiates a gating pulse covering SCR on-time in $R_{20}$ which is passed to multivibrator $T_8 T_{13} T_9 T_{10}$ via clamp $T_{12}$.

Multivibrator $T_8 T_{13} T_9 T_{10}$ produces a train of closely-spaced trigger pulses as in curve 4. Alternatively, a single-shot multivibrator may be used, in which case only the first of the train of pulses of curve 4 will be produced.

The advantage of the train of pulses covering the SCR on-time is that, if for some reason the first pulse fails to fire the SCR, a succeeding pulse will do so with little error. Pulse output from the "OUTPUT" terminals is thus applied to the control electrode of the SCR (not shown).

The multivibrator $T_8 T_{13} T_9 T_{10}$ operates as follows:

Where no pulse output is called for, $T_{12}$ is gated off, $D_{18}$ conducts, $T_8$ is heavily bottomed and the base of $T_9$ is clamped at about $-0.6$ volts through $R_{33}$ and $D_6$. The base of $T_{10}$ is biassed positive by $R_{40}$, $R_{39}$ and $T_{10}$ is cut off.

When $T_2$ is gated on, $D_{18}$ is cut off and the collector of $T_8$ rises towards positive supply voltage. $D_6$ is cut off and $T_9$ is cut off, its current being diverted through $T_{10}$ to give an output voltage.

Feedback through C8, D11 maintains the base of $T_8$ at about $-0.6$ v. via clamp D7, $T_8$ is maintained cut off and $T_9$ also cut off. However, the voltage of the right hand terminal of C9 begins to fall by discharge through $R_{33}$. $T_9$ starts to conduct, the collector of $T_9$ rises in voltage and $T_8$ is very quickly turned on and reinforces the condition of $T_9$, through the feedback loop, terminating the pulse.

$T_{13}$ holds $T_8$ in bottomed condition via $R_9$, as if $T_{12}$ were nonconducting. But as C9 discharges, the base of $T_{13}$ goes negative and $T_{13}$ cuts off. $T_8$ can then no longer be held in bottomed condition, the collector of $T_8$ moves positively and a new pulse begins.

The circuit therefore produces pulses whose duration is governed by C9, $R_{33}$ and spacing by C8, $R_{30}$.

If $T_{12}$ is nonconducting, $T_8$ is bottomed viz D18, $R_{56}$ and there is no regenerative action so the pulse train ceases.

The circuit has the useful property that the first pulse of a train is formed immediately $T_{12}$ bottoms and that when $T_{12}$ is not bottomed, the pulse train definitely ceases.

FIG. 2 shows a circuit diagram for production of the signal for application to the "error in " terminals of FIG. 1.

$T_{101}$ — $T_{105}$ form a trapesoidal oscillator at 10 kHz. of the so-called "hysteresis" type, which is very suitable since it maintains output and restarts even after momentary interruption of the power supply. Constant-current 10 kHz. output from $T_{106}$ and $T_{107}$ is fed to winding P of current feedback transformer $TL_2$.

A motor is connected in series with the anode-cathode path of the controlled SCR (not shown). Voltage proportional to the current in the armature A of the controlled motor is applied via potentiometer P1 and diodes D112, D113 to winding S1 of transformer $TL_2$.

Winding P is of high magnetizing impedance with S1, S2 open circuited. The constant current drive from $T_{106}$, $T_{107}$ therefore tends to set up a high voltage. However, when the voltage (at 10 kHz. in S1 reaches that applied by diodes D112, D113, S1 is effectively short-circuited and the voltage in P (and in S2) is prevented from rising further.

S2 voltage is applied via diodes D105, D106 to $R_{122}$ and C104, to feed to base of $T_{108}$ of the differential amplifier $T_{108}$, $T_{109}$.

The output of $T_{108}$ in $R_{131}$ drives $T_{112}$ which drives $T_{110}$, which in turn drives $T_{109}$ via $R_{129}$ and therefore $T_{108}$. $T_{108}$, $T_{109}$, $T_{110}$ and $T_{112}$ therefore form a feedback amplifier and the current in $R_{134}$ is strictly proportional to the input voltage.

$T_{111}$ is of similar configuration to $T_{110}$ and has a large emitter resistance $R_{134}$. The current in $T_{111}$ is therefore proportional to the input voltage from S2, and an integrated voltage is produced in C109.

This integrated voltage is applied to "super-alpha" impedance changer $T_{114}$, $T_{115}$ and transferred to C112, D108 ensuring that the peak value is retained on C112. The slight discharge of C112 between peaks through $R_{143}$ is negligable.

The voltage on C109 is reset to zero by heavy conduction of $T_{113}$.

The reference transformer $TL_3$ supplies full-wave rectified voltage through D110, D111, $R_{137}$ and $R_{136}$. The positive-going cusps of this voltage are applied via D107 to the base of $T_{113}$ virtually short-circuiting C109 at each half-cycle and therefore resetting its voltage to zero, although the peak value for that cycle on C112 is, of course, retained.

The voltage on C112 is passed to the output terminals by low-impedance emitter-followers $T_{116}$ and $T_{117}$ and diode D109 and are thence taken as "error signal" to the "error in" terminals of FIG. 2.

The advantages of the current-integration error signal circuit described are, as compared with the normal current transformer, rectifier, filter system that effective filtering may be obtained with a short time constant, there is very high rejection of noise in the system, and sense of control is not lost. With reference to this latter point, it is possible with some waveforms that the peak amplitude increases, while the average is decreasing. Therefore in any peak control, the sense of the servo action may reverse with inaccuracies and even instability resulting. The use of the integrated waveforms prevents this in the same way as integration in FIG. 2 prevented firing errors due to waveform distortions.

The following are typical values of components in FIGS. 2 and 3. All resistors are one-half Watt, 5 percent unless otherwise noted. Capacities in microfarode, resistance in ohms (K = kilo; M = mega; p = pico; m = milli):

| | | | |
|---|---|---|---|
| $R_1$=68k | $R_{33}$=22k | $R_{121}$=8.2k | $C_2$=80 |
| $R_2$=470 1W | $R_{34}$=27 | $R_{122}$=22k | $C_3$=.0022 |
| $R_3$=4.7k | $R_{35}$=330 1W | $R_{123}$=6.8k | $C_4$=.022 |
| $R_4$=6.8k | $R_{36}$=47 | $R_{124}$=22k | $C_5$=2.5 |
| $R_5$=560 | $R_{37}$=470 1W | $R_{125}$=2.2k | $C_6$=240 p |
| $R_6$=2.2k | $R_{38}$=27 | $R_{126}$=8.2k | $C_7$=.47 |
| $R_7$=2.2k | $R_{39}$=2.2k | $R_{127}$=1k | $C_8$=.022 |
| $R_8$=68 | $R_{40}$=10k | $R_{128}$=27 | $C_9$=.0022 |
| $R_9$=22k | $R_{56}$=10k | $R_{129}$=47k | $C_{12}$=.022 |
| $R_{10}$=1k | $R_{57}$=47 | $R_{130}$=22k | $C_{17}$=.047 |
| $R_{11}$=27 | $R_{58}$=47 | $R_{131}$=10k | $C_{18}$=.0022 |
| $R_{12}$=4.7k | $R_{59}$=15k | $R_{132}$=5.6k | $C_{19}$=80 |
| $R_{13}$=2.2m | $R_{101}$=1.2k | $R_{133}$=5.6k | $C_{20}$=80 |
| $R_{14}$=15k 2% | $R_{102}$=1.2k | $R_{134}$=1k | $C_{101}$=.0022 |
| $R_{15}$=1k 2% | $R_{103}$=10k | $R_{135}$=1m | $C_{102}$=.0047 |
| $R_{16}$=10k | $R_{104}$=3.3k | $R_{136}$=1k | $C_{103}$=32 |
| $R_{17}$=56k | $R_{105}$=100k | $R_{137}$=470 | $C_{104}$=.047 |
| $R_{18}$=6.8k | $R_{106}$=10k | $R_{138}$=470 | $C_{105}$=.0022 |
| $R_{19}$=1.2k | $R_{107}$=5.6k | $R_{139}$=470 | $C_{106}$=.0022 |
| $R_{20}$=10k | $R_{108}$=22k | $R_{140}$=1m | $C_{107}$=.022 |
| $R_{21}$=10k | $R_{109}$=470 | $R_{141}$=100 | $C_{108}$=.022 |
| $R_{22}$=22k | $R_{110}$=22k | $R_{142}$=27 | $C_{109}$=.47 |
| $R_{23}$=10k | $R_{111}$=1k 1W | $R_{143}$=1m | $C_{110}$=.47 |
| $R_{24}$=1.5k | $R_{112}$=100 | $R_{144}$=470 | $C_{111}$=32 |
| $R_{25}$=10k | $R_{113}$=2.2k | $R_{145}$=470 | $C_{112}$=.47 |
| $R_{26}$=22k | $R_{114}$=47 | $R_{146}$=470 | $C_{113}$=32 |
| $R_{27}$=6.8k | $R_{115}$=270 2W | $R_{147}$=470 | $L_{36}$=10 m H |
| $R_{28}$=15k | $R_{116}$=47 | $R_{148}$=1k | $L_{117}$ |
| $R_{29}$=3.3k | $R_{117}$=27 | $R_{149}$=47k | $L_{118}$ |
| $R_{30}$=68k | $R_{118}$=27 | $R_{151}$=22k | $TL_2$=Toroid ferrite core. |
| $R_{31}$=470 | $R_{119}$=470 | $P_1$=10 | P=42 turns. |
| $R_{32}$=470 | $R_{120}$=27 | $C_1$=.27 | $S_1$=42 turns. |
| | | | $S_2$=36 turns. |

All NPN transistors are type 2N3643 and all PNP transistors are type 2N3644. All diodes are type AN1103 unless otherwise noted.

I claim:

1. A firing unit for controlling the application of cyclic power to a load device for intervals determined by an error signal; including; integrating means to produce a voltage representing the integral of the voltage of the cyclic power source; clamping means to clamp the value of said integrated voltage at a constant predetermined level at the end of each said half cycle of power source voltage; reset means for resetting said integrated voltage at the end of each said half cycle; control means for producing a DC error signal; and comparator means fed from said integrating means and said control means to produce a firing pulse when the instantaneous values of said error signal and said integrated voltage are equal.

2. A unit as claimed in claim 1, in which said control means includes; a current integrator producing a voltage proportional to the integral of the current in said load device; current reset means to reset said voltage periodically; and means producing a DC error signal proportional to the value of said voltage immediately before reset.

3. A unit as claimed in claim 2, in which said control means additionally includes a transformer having a high impedance primary winding, a secondary winding and a further secondary winding, said primary winding being fed from an oscillator, said secondary winding being connected by a rectifier to a resistance in the load circuit and said further secondary winding being connected to said current integrator.

4. A circuit for deriving a DC error signal from a cyclically energized load circuit including; a current integrator producing a voltage proportional to the integral of the load current; reset means to reset said voltage periodically; and storage means driven by said current integrator to produce a DC signal proportional to the value of said voltage immediately before reset, said DC signal constituting said error signal.